No. 752,417. PATENTED FEB. 16, 1904.
R. B. PRICE.
RUBBER VEHICLE TIRE.
APPLICATION FILED JUNE 23, 1903.
NO MODEL.

Witnesses:
E. F. Wilson
H. Walter Forster

Inventor:
Raymond B. Price
By Rudolph Jun
Attorney

THE NORRIS PETERS CO., PHOTO-LITHO., WASHINGTON, D. C.

No. 752,417.

Patented February 16, 1904.

UNITED STATES PATENT OFFICE.

RAYMOND B. PRICE, OF CHICAGO, ILLINOIS.

RUBBER VEHICLE-TIRE.

SPECIFICATION forming part of Letters Patent No. 752,417, dated February 16, 1904.

Application filed June 23, 1903. Serial No. 162,713. (No model.)

*To all whom it may concern:*

Be it known that I, RAYMOND B. PRICE, a citizen of the United States, residing at Chicago, in the county of Cook and State of Illinois, have invented certain new and useful Improvements in Rubber Vehicle-Tires; and I do hereby declare the following to be a full, clear, and exact description of the invention, such as will enable others skilled in the art to which it appertains to make and use the same.

My invention relates to a novel construction in a rubber vehicle-tire, the object being to provide a tire in which the cutting action of the retaining-wires is avoided and which is so stiffened at its base as to prevent lateral rolling and longitudinal creeping of said tire; and it consists in the features of construction and combinations of parts hereinafter fully described and claimed.

Figure 1:
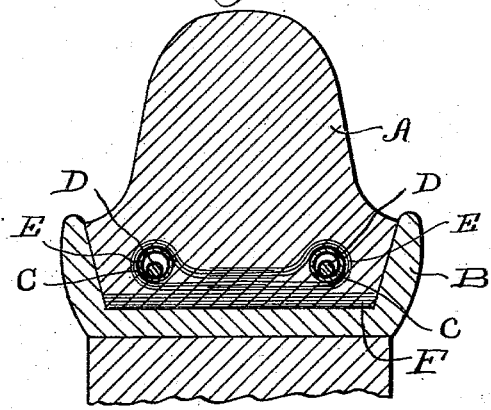
Figure 2:
Figure 5:
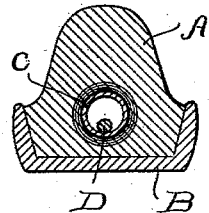
Figure 3:
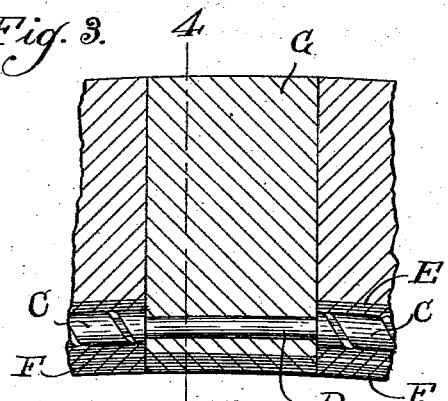
Figure 4:
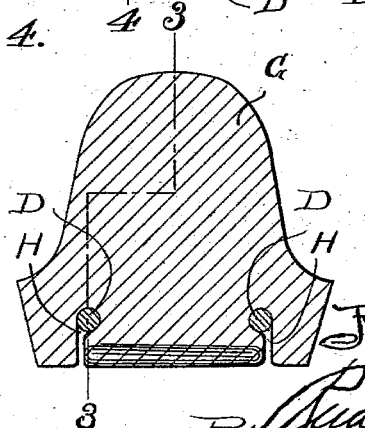

In the accompanying drawings, illustrating my invention, Figure 1 is a transverse section of a tire constructed in accordance with my invention. Fig. 2 is a detail view in elevation of the inner metal tube for receiving the retaining-wires. Fig. 3 is a fragmentary longitudinal section of the tire at the joint. Fig. 4 is a transverse section on the line 4 4 of Fig. 3. Fig. 5 is a transverse section of a modified form of my tire.

Further objects of my invention are to provide means for enabling the retaining-wires to be readily joined at their ends and to adapt the tire to be easily and firmly secured in the rim or channel without the aid of special expensive apparatus.

Referring now to said drawings, A indicates the tire, and B the rim or channel. In the base portion of said tire A, I embed what may be termed "tubes" C, consisting of flat spirally-wound wires or bands which are adapted to receive retaining-wires D. The said tubes C are inclosed in a plurality of layers E of frictioned duck, each of said layers embracing both tubes and having its edges overlapped between said tubes. The said tubes and duck are intermolded in the base portion of the tire, preferably about midway between the bottom thereof and the outer part of said base portion, which lies entirely within the rim or channel B. In the portion of the base below the layers of duck surrounding the tubes, and preferably directly at the bottom of the tire, several layers F of duck are intermolded, which serve to stiffen said base, and thereby aid to guard against lateral rolling of the tire. The said tubes C lie equidistant from the sides of said base and preferably sufficiently far inward from said sides to provide a good cushion of rubber between said tubes and the sides of said base. By inclosing said tubes C in duck the rubber is prevented from flowing into said tubes during the process of vulcanization, so that they remain clear and enable the retaining-wires to be very easily inserted. The duck inclosing said tubes serves to greatly stiffen the base and also to prevent any cutting action of the tube, while at the same time it serves to spread the pressure exerted by said tubes over a greater area. By reason of the flexible nature of said tubes the tire is enabled to be compressed longitudinally to an extent sufficient to expose enough of the ends of the retaining-wires to enable the latter to be welded together at their ends; but as such compression requires the exercise of considerable power and the use of special apparatus I prefer in mounting said tires to cut the same shorter than the circumference of the rim or channel, so that the retaining-wires are left to project a sufficient distance to permit same to be welded together at their ends, the tire being also slightly longitudinally compressed at the same time to still further expose said wires. A block G is then inserted in the open space, said block being provided in its base with recesses H to receive the retaining-wires. The said recesses H are spaced farther apart than the wires and are deflected toward each other at their upper ends, so that the wires in entering the deflected portions of said recesses serve to firmly hold said block in place. The base of said block G between said recesses H has a plurality of layers of duck intermolded therein to stiffen the same laterally, so that said block cannot readily be removed after being sprung in place over said wires. The ends of said block G are coated with rubber cement and after being inserted the ends of the tire are released and bear against the ends of said block with great pressure, thus further serving to hold same while the cement joins the abutting ends.

My invention also comprehends the use of flexible tubes of larger diameter than the retaining wires or bands, and although I have shown such construction only in Fig. 5 I desire it to be understood that the construction shown in Fig. 1 may also be modified to accord with the construction shown in Fig. 5; but I have omitted illustration of such modification for purposes of simplicity. Said larger tubes being flexible will yield to pressure on the tread of the tire and increase the resiliency thereof, the action of said tubes being such as to give the tire very much the same character as a pneumatic tire without being susceptible to punctures, and are further very advantageous in a solid tire by reason of the fact that they reduce the weight of same and render them less expensive.

I claim as my invention—

1. The combination with a vehicle-wheel, a rim or channel thereon, and a rubber tire adapted to fit said rim or channel, of a flexible metallic tube passing longitudinally through said tire, frictioned fabric surrounding said tube and a retaining-band passing through said tube.

2. The combination with a vehicle-wheel, a rim or channel thereon, and a rubber tire adapted to fit said rim or channel, of a flexible metallic tube passing longitudinally through said tire, frictioned fabric surrounding said tube and a retaining-band passing through said tube, said tube being of larger diameter than said retaining-band.

3. The combination with a vehicle-wheel and a rim or channel thereon, of a rubber tire adapted to fit said rim or channel, a flexible metallic tube passing longitudinally through said tire, a plurality of plies of frictioned fabric inclosing said tube, and a retaining-band passing through said tube.

4. In a device of the kind specified, the combination with a rim or channel, of a rubber tire adapted to fit within the same, flexible metallic tubes intermolded in the base portion of said tire, and retaining-bands passing through said tubes and secured at their ends, to hold said tire in said rim or channel.

5. In a device of the kind specified, the combination with a rim or channel, of a rubber tire adapted to fit within the same, flexible metallic tubes intermolded in the base portion of said tire, and retaining-bands passing through said tubes and secured at their ends, said tubes being of larger diameter than said retaining-bands.

6. In a device of the kind specified, the combination with a rim or channel and a rubber tire adapted to be mounted thereon, of devices for securing said tire in said rim or channel comprising a plurality of flexible metallic tubes and a layer of frictioned fabric surrounding and connecting said tubes, said tubes and inclosing fabric being intermolded in the base portion of said tire, and retaining-bands passing through said tubes and secured at their ends to secure said tire in place.

7. In a device of the kind specified, the combination with a rim or channel and a rubber tire adapted to be mounted thereon, of devices for securing said tire in said rim or channel comprising a plurality of flexible metallic tubes and a layer of frictioned fabric surrounding and connecting said tubes, said tubes and inclosing fabric being intermolded in the base portion of said tire, and retaining-bands passing through said tubes, said tubes being of larger diameter than said retaining-bands.

8. The combination with a vehicle-wheel, and a rim or channel thereon, of a rubber tire adapted to fit said rim or channel, a plurality of parallel flexible metallic tubes passing longitudinally through said tire, a plurality of plies of frictioned fabric surrounding and connecting said tubes and intermolded therewith in the base portion of said tire, and retaining-bands passing through said tubes.

9. The combination with a vehicle-wheel, and a rim or channel thereon, of a rubber tire adapted to fit said rim or channel, a plurality of parallel flexible metallic tubes passing longitudinally through said tire, a plurality of layers of frictioned fabric passing around and inclosing said tubes, said fabric and tubes being intermolded in the base portion of said tire, and retaining-bands passing through said tubes and projecting beyond the ends of said tire and joined at their ends in the aperture between the ends of the tire, a tire-section adapted to fill said aperture and recesses in the base of said section adapted to receive said bands.

10. The combination with a vehicle-wheel, and a rim or channel thereon, of a rubber tire adapted to fit said rim or channel, a plurality of parallel flexible metallic tubes passing longitudinally through said tire, a plurality of layers of frictioned fabric passing around and inclosing said tubes, said fabric and tubes being intermolded in the base portion of said tire, and retaining-bands passing through said tubes and projecting beyond the ends of said tire and secured at their ends in the aperture between the ends of the tire, a tire-section adapted to fill said aperture, recesses in the base of said section spaced differently than said bands and adapted to receive the same and having their upper ends deflected to accord with the spacing of said bands, whereby when said section is in place it will be held by said bands.

11. The combination with a vehicle-wheel, and a rim or channel thereon, of a rubber tire adapted to fit said rim or channel, a plurality of parallel flexible metallic tubes passing longitudinally through said tire, a plurality of layers of frictioned fabric passing around and inclosing said tubes and having their edges overlapped, said fabric and tubes being intermolded in the base portion of said tire, and retaining-bands passing through said tubes and projecting beyond the ends of said tire and joined at their ends in the aperture between the ends of the tire, a tire-section adapted to fill said aperture, recesses in the base of said section spaced differently than said bands and adapted to receive the same and having their upper ends deflected to accord with the spacing of said bands, and lateral stiffening devices intermolded in the base of said section for preventing variation in width, whereby when said section is sprung in place over said bands the latter will securely hold said section against removal.

In testimony whereof I affix my signature in presence of two witnesses.

RAYMOND B. PRICE.

Witnesses:
 RUDOLPH WM. LOTZ,
 E. F. WILSON.